(12) United States Patent
Tomioka

(10) Patent No.: US 8,416,271 B2
(45) Date of Patent: Apr. 9, 2013

(54) OPTICAL SCANNING DEVICE AND IMAGE FORMING APPARATUS USING THE SAME

(75) Inventor: Yuichi Tomioka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/297,107

(22) Filed: Nov. 15, 2011

(65) Prior Publication Data

US 2012/0057903 A1    Mar. 8, 2012

Related U.S. Application Data

(62) Division of application No. 12/110,284, filed on Apr. 25, 2008, now Pat. No. 8,077,193.

(30) Foreign Application Priority Data

May 1, 2007 (JP) .................................. 2007-120513

(51) Int. Cl.
*B41J 2/435* (2006.01)
*B41J 15/14* (2006.01)
*B41J 27/00* (2006.01)

(52) U.S. Cl.
USPC ........................... 347/241; 347/230; 347/256

(58) Field of Classification Search .................. 347/230, 347/241–245, 256–261; 359/197, 204, 216.1
See application file for complete search history.

(56) References Cited

U.S. PATENT DOCUMENTS

| | | | |
|---|---|---|---|
| 4,040,737 A * | 8/1977 | Masaki et al. ................... | 355/49 |
| 5,161,047 A | 11/1992 | Tomita et al. ............. | 359/216.1 |
| 5,555,123 A | 9/1996 | Kaplan ......................... | 359/197 |
| 6,400,488 B1 | 6/2002 | Nagasaka et al. ............. | 359/212 |
| 6,756,583 B2 | 6/2004 | Yamawaki ................... | 250/234 |

(Continued)

FOREIGN PATENT DOCUMENTS

| | | |
|---|---|---|
| JP | 51-120737 | 11/1992 |
| JP | 8-334720 | 12/1996 |

(Continued)

OTHER PUBLICATIONS

Chinese Office Action dated Jun. 19, 2009 from corresponding Chinese Application No. 200810092838.2, and English language translation thereof.

(Continued)

*Primary Examiner* — Hai C Pham
(74) *Attorney, Agent, or Firm* — Fitzpatrick, Cella, Harper & Scinto

(57) ABSTRACT

An optical scanning device configured to remove or sufficiently reduce ghost light includes an input optical system for directing a light beam from a light source to a deflecting surface of a deflector, and an imaging optical system for imaging a light beam scanningly deflected by the deflecting surface upon a surface to be scanned, wherein, in a sub-scan section, the light beam is incident on the deflecting surface of the deflector from an oblique direction with respect to an optical axis of the imaging optical system, wherein a light blocking member for blocking ghost light is disposed on a light path between the deflecting surface and the scanned surface, wherein an end portion of the light blocking member in the sub-scan direction is formed with a curved shape having a height in the sub-scan direction which height changes in accordance with the position in the main-scan direction.

2 Claims, 10 Drawing Sheets

U.S. PATENT DOCUMENTS

| | | | |
|---|---|---|---|
| 6,829,001 B2 * | 12/2004 | Yamakawa | 347/261 |
| 6,987,593 B2 | 1/2006 | Hayashi et al. | 359/205 |
| 7,142,339 B2 | 11/2006 | Tomioka | 359/204 |
| 7,184,185 B2 | 2/2007 | Tamaru et al. | 359/204 |
| 2003/0160860 A1 | 8/2003 | Yamakawa | 347/261 |
| 2004/0240000 A1 | 12/2004 | Miyatake et al. | 358/474 |
| 2004/0263933 A1 | 12/2004 | Nakahata | 359/196 |
| 2005/0029438 A1 | 2/2005 | Kuribayashi | 250/234 |
| 2006/0017997 A1 | 1/2006 | Tamaru et al. | 359/204 |
| 2007/0091402 A1 | 4/2007 | Tomioka | 359/201 |

FOREIGN PATENT DOCUMENTS

| | | | |
|---|---|---|---|
| JP | 9-281423 | | 10/1997 |
| JP | 09281423 A | * | 10/1997 |
| JP | 10-096870 | | 4/1998 |
| JP | 2000-193903 | | 7/2000 |
| JP | 2002-196269 | | 7/2002 |
| JP | 2005-004050 | | 1/2005 |
| JP | 2006-038912 | | 2/2006 |
| JP | 2007-17915 | | 1/2007 |

OTHER PUBLICATIONS

Chinese Office Action dated Aug. 11, 2010 from corresponding Chinese Application No. 2008100092838.2 and English language translation thereof.

Partial European Search Report dated Aug. 14, 2008 from corresponding European Application No. 08008306.6.

Extended European Search Report dated Oct. 16, 2008 from corresponding European Application No. 08008306.6.

Korean Office Action dated Mar. 9, 2010 from corresponding Korean Application No. 10-2009-0133100, and English language translation thereof.

Japanese Office Action dated Dec. 20, 2011, in Japanese Patent Application No. 2007-120513, and excerpted English translation thereof.

Japanese Office Action dated Dec. 20, 2011, in Japanese Patent Application No. 2010-105349, and excerpted English translation thereof.

* cited by examiner

OPTICAL SCANNING DEVICE AND IMAGE FORMING APPARATUS USING THE SAME

CROSS-REFERENCE TO RELATED APPLICATION

This application is a divisional of and claims the benefit of U.S. patent application Ser. No. 12/110,284, filed Apr. 25, 2008, the contents of which are hereby incorporated by reference as if fully stated herein. This application claims priority from Japanese Patent Application No. 2007-120513 filed May 1, 2007, which is hereby incorporated by reference.

FIELD OF THE INVENTION AND RELATED ART

This invention relates to an optical scanning device and an image forming apparatus using the same. The present invention is suitably usable in an image forming apparatus such as a laser beam printer, a digital copying machine or a multi-function printer, for example, having an electrophotographic process.

Conventionally, in a scanning optical system of a laser beam printer (LBP) or a digital copying machine, a light beam from light source means having been optically modulated in accordance with an imagewise signal is periodically deflected by an optical deflector comprising a rotary polygonal mirror (polygon mirror). The deflected light beam is converged by an imaging optical system having an fθ characteristic, onto a photosensitive recording medium (photosensitive drum) surface as a light spot, by which the surface is optically scanned to perform the image recording thereon.

In recent years, in image forming apparatuses such as laser beam printers, digital copying machines and multifunction printers, attainment of higher picture quality has been desired. One possible factor that causes image deterioration is ghost light (reflected light) which is unnecessary for the image formation.

Conventionally, various optical scanning devices arranged to remove such ghost light have been proposed (see Patent Document No. 1).

In the patent document No. 1, a light blocking plate (light blocking member) is provided inside an imaging optical system, to avoid that the ghost light reflected from the scanned surface is incident again on a rotary polygonal mirror (polygon mirror) by which the ghost light is scanningly deflected again and incident on the scanned surface once more.

This light blocking plate is disposed at a position spaced by a predetermined distance in a sub-scan direction with respect to the height in the sub-scan direction where the effective light beam passes, in order to assure that it blocks only the ghost light without blocking the effective light beam (real light beam) which forms an image.

The shape of the light blocking plate disclosed in the patent document No. 1 is straight (planar) as usual or curved.

In this specification, the "ghost light" refers to the light other than the light which is reflected by a deflecting surface of an optical deflector, which passes through an imaging optical system without being reflected by a surface of the imaging optical system or any other surface and which is incident on the scanned surface, and besides which is incident on the effective scan region of the scanned surface.

Furthermore, if a plurality of optical scanning devices are used as shown in FIG. 1 of a first embodiment of the present invention to be described later, the ghost light may include a light beam which is reflected by a surface of an imaging optical system or any other surface in one optical scanning device, which enters another optical scanning device and which is incident on the scanned surface of the other optical scanning device.

Furthermore, the "effective light beam" refers to the light beam which is reflected by the deflecting surface of deflecting means, which passes through the imaging optical system without being reflected by a surface thereof, and besides which is incident on the effective scan region of the scanned surface.

[Patent Document]
1. Japanese Laid-Open Patent Application No. 2000-193903

In the patent document No. 1, if an optical system wherein ghost light passes a position quite close to the effective light beam is used, the ghost light cannot be sufficiently blocked. The reason is as follows.

In the patent document No. 1, for smallness in size of the overall system, the light beam to be incident on the deflecting surface of the deflecting means is incident, within a sub-scan section, in an oblique direction (oblique incidence) with respect to a normal to the deflecting surface. As a result of this, the locus of scan of the effective light beam when it passes over the light blocking plate having a planar shape has a curved shape.

FIG. 11A and FIG. 11B are graphs (schematic diagrams) which depict the passage region (scan locus) of the effective light beam (solid line) to be used for the image formation on the light blocking plate as seen from the optical axis direction of the imaging optical system and the passage region of the ghost light (dotted line) as well as the shape of the end-portion of the light blocking plate in the sub-scan direction. FIG. 11A is a schematic diagram where the light blocking plate 91 is disposed below (lower side as seen in the drawing) the passage region of the effective light beam. FIG. 11B is a schematic diagram where the light blocking plate 91 is disposed above (upper side as seen in the drawing) the passage region of the effective light beam.

As shown in FIG. 11A and FIG. 11B, if the ghost light passes a position close to the effective light beam (passage region) having a curved scan locus (or it passes through a portion of the passage region of the effective light beam), the following problems may occur in the patent document No. 1.

(1) With the light blocking plate 91 having a straight end portion in the sub-scan direction, whatever the height in the sub-scan direction of the light blocking plate 91 is changed, it blocks the effective light beam at its end portion in the main-scan direction.

(2) It cannot block the ghost light in the central portion of the main-scan direction.

Namely, the light blocking plate 91 having a straight end portion in the sub-scan direction as of the patent document No. 1 has the problem that, in the whole region of the effective scan region (printing region), the ghost light cannot be sufficiently blocked without shading the effective light beam.

Furthermore, the curved shape of the effective light beam when it passes over the light blocking plate 91 changes in accordance with the oblique incidence angle thereof upon the deflecting surface in the sub-scan section, the disposed position of the light blocking plate 91 in the imaging optical system, and the surface shape of the imaging optical element which is disposed at the deflecting means side of the light blocking plate 91. However, the patent document No. 1 does not mention how to specify the curve to constitute the shape of the light blocking plate 91 in the sub-scan section.

Thus, in the patent document No. 1 it is unable to determine the shape of the light blocking plate which assures sufficient interception of ghost light without eclipsing the effective light beam in the whole region of the effective scan region. In other words, the structure shown in the patent document No. 1 has a problem that, when it is used with an optical system in which ghost light passes a position quite close to the effective light beam, the ghost light can not be blocked sufficiently.

SUMMARY OF THE INVENTION

The present invention provides an optical scanning device and an image forming apparatus using the same, by which ghost light can be assuredly removed or sufficiently reduced.

In accordance with an aspect of the present invention, there is provided an optical scanning device, comprising: a light source device; a deflecting device having a deflecting surface; an input optical system configured to direct a light beam from said light source device to the deflecting surface of said deflecting device; and an imaging optical system configured to image a light beam scanningly deflected by the deflecting surface of said deflecting device, upon a surface to be scanned; wherein, in a sub-scan section, the light beam to be incident on the deflecting surface of said deflecting device is incident thereon from an oblique direction with respect to an optical axis of said imaging optical system, wherein a light blocking member configured to block ghost light is disposed on a light path between the deflecting surface and the scanned surface, and wherein, when a point of intersection between said light blocking member and the optical axis of said imaging optical system is denoted by Y=0, an arbitrary position on said light blocking member in a main-scan direction is denoted by Y [mm], a spacing between an end portion of said light blocking member in the sub-scan direction and a plane which is perpendicular to a rotational axis of said deflecting device and which contains an axial deflection point of the light beam incident on the deflecting surface of said deflecting device at the arbitrary position Y in the main scan direction is denoted by h(Y) [mm], a spacing at the position Y=0 in the main scan direction is denoted by h(0) [mm], a difference of the spacing h(Y) with respect to the spacing h(0) is taken as a curved quantity $\Delta h(Y)$ of said light blocking member, an incidence angle defined between the optical axis of said imaging optical system and the light beam incident on the deflecting surface of said deflecting device within the sub-scan section is denoted by $\alpha$ [rad], and a distance from the axial deflection point to said light blocking member in said plane is denoted by L [mm], throughout an effective scan region the curved quantity $\Delta h(Y)$ of said light blocking member satisfies the following conditional expressions, $$0.5 \leq \Delta h(Y) \div \left[\tan\alpha \times L \times \left\{\frac{1}{\cos\{\text{ATAN}(\frac{|Y|}{L})\}} - 1\right\}\right] \leq 1.5 \quad (1)$$

$$\Delta h(Y) = |h(Y) - h(0)| \quad (2)$$

In accordance with the present invention, a small-sized optical scanning device and an image forming apparatus using the same, by which ghost light can be assuredly removed or sufficiently reduced and by which a high-definition and high-resolution image can be formed, are accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

In the present invention, ATAN (arctan or $\tan^{-1}$) is an inverse function of tan. More specifically, if $\tan(x)=y$, then $\arctan(y)=x$ applies. However, since the range of ATAN (arctan or $\tan^{-1}$) is made with an open interval $(-\pi/2, \pi/2)$, there is a condition that x is within such range.

Embodiment 1

Figure 1:
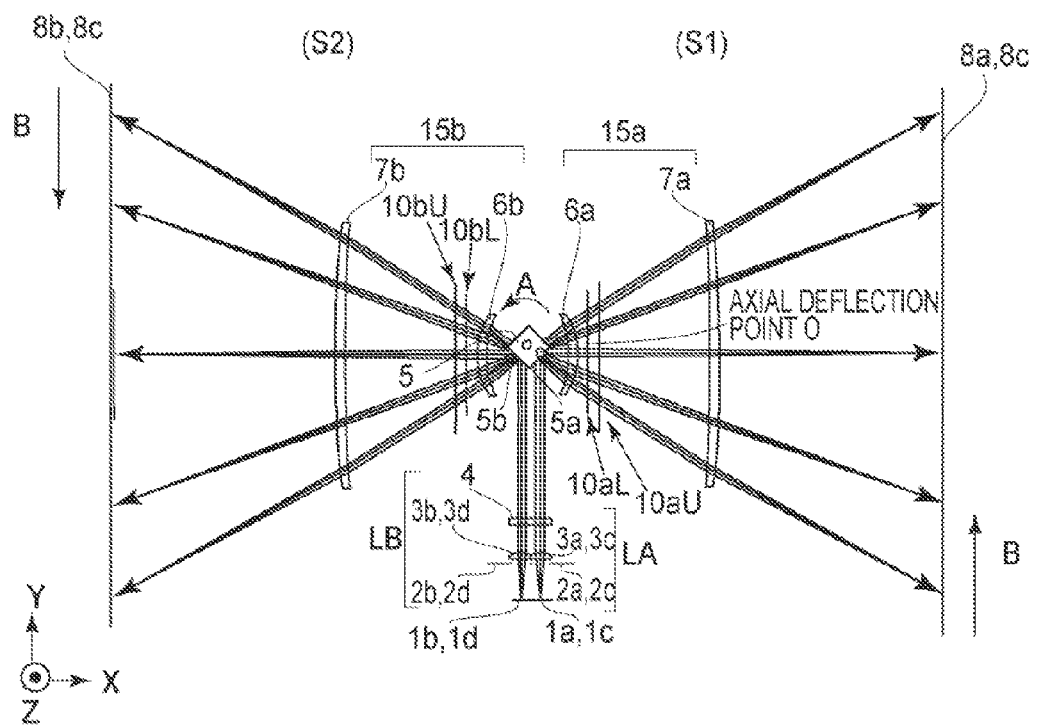
FIG. 1 is a main-scan sectional view of a first embodiment of the present invention.
Figure 2A:
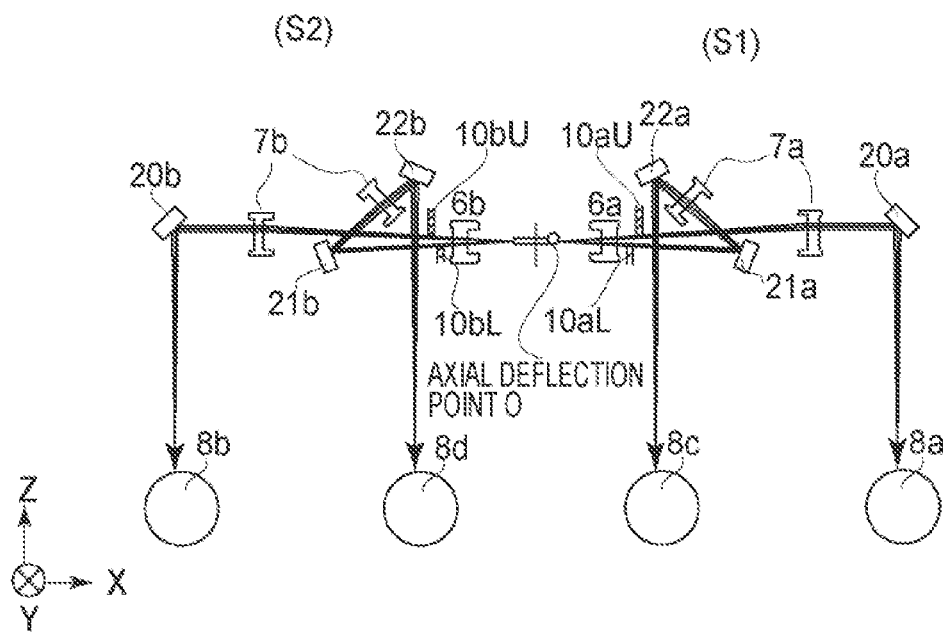
FIG. 2A are a sub-scan sectional view of the first embodiment of the present invention.
Figure 2B:
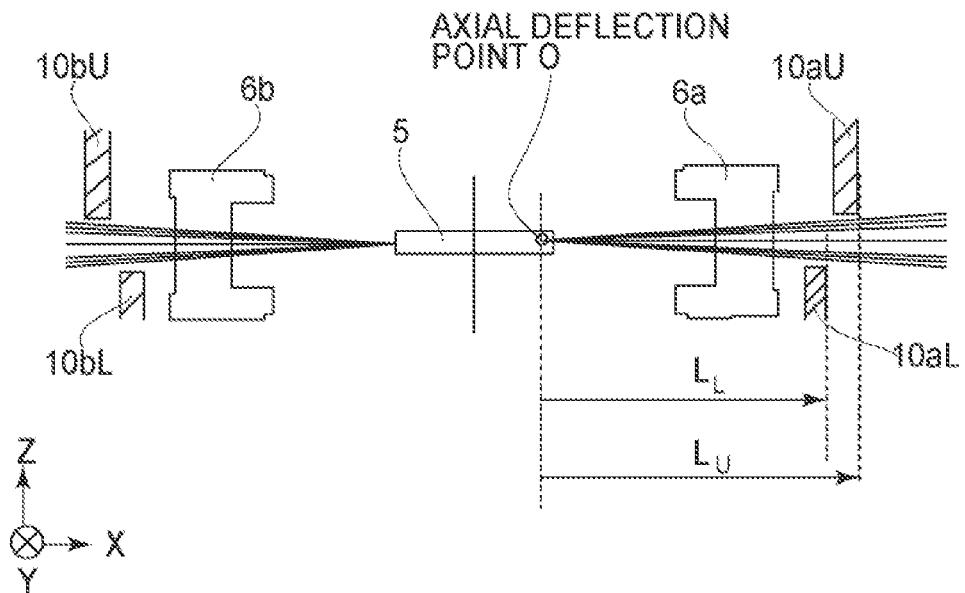
FIG. 2B is an enlarged drawing of a portion of FIG. 2A.

FIG. 1 is a sectional view (main-scan sectional view) of a main portion of a first embodiment of the present invention, along a main-scan direction. FIG. 2A is a sectional view (sub-scan sectional view) of a main portion of the first embodiment of the present invention, along a sub-scan direction. FIG. 2B is an enlarged schematic diagram of portion of FIG. 2A.

In the following description, the term "main-scan direction" (Y-direction) refers to a direction in which a light beam is scanningly deflected by a deflecting surface of deflecting means.

The term "sub-scan direction" refers to a direction which is parallel to the rotational axis of the deflecting means.

The term "main-scan section" refers to a plane having a normal thereto extending along an axis parallel to sub-scan direction.

The term "sub-scan section" refers to a plane having a normal thereto extending along an axis parallel to main-scan direction. In other words, the sub-scan section is a plane having a normal thereto extending along the rotation axis of the deflecting means.

An image forming apparatus according to the present embodiment is a tandem type image forming apparatus which comprises a plurality of imaging optical systems 15a and 15b disposed opposed to each other while sandwiching therebetween an optical deflector (polygon mirror) as deflecting means. Two light beams are incident on each of the imaging optical systems 15a and 15b so that, by means of a single optical deflector 5, four light beams are scanningly deflected at the same time. The four light beams are directed onto photosensitive drum surfaces 8a, 8b, 8c and 8d as scanned surfaces corresponding to the four light beams, respectively, to optically scan these photosensitive surfaces 8a, 8b, 8c and 8d.

Denoted in the drawings at S1 and S2 are first and second optical scanning devices (hereinafter, it may be called "station" or "scanning optical system"). The image forming apparatus of the present embodiment comprises plural optical scanning devices.

With regard to the components of the first and second optical scanning device S1 and S2, in the following description, those of the first optical scanning device S1 will be mainly described. Furthermore, those of the components of the second optical scanning device S2 corresponding to the components of the first optical scanning device S1 will hereinafter be referred to with parentheses.

The first (second) optical scanning device S1 (S2) has aperture stops 2a and 2c (2b and 2d) for regulating light beams from light source devices 1a and 1c (1b and 1d), respectively. It further comprises collimator lenses 3a and 3c (3b and 3d) for converting the light beams regulated by the aperture stops 2a and 2c (2b and 2d) into parallel light beams. The light source devices 1a and 1c constitute a single light source unit.

Furthermore, it comprises a cylindrical lens 4 for imaging the light as linear image elongating in the main-scan direction, and an optical deflector 5 as the deflecting means. Furthermore, it comprises an imaging optical system 15a (15b) for focusing the light beam scanningly deflected (reflected) by the optical deflector 5 into a spot on the photosensitive drum surface (scanned surface) 8a or 8c (8b or 8d).

In the present embodiment, the first and second optical scanning devices S1 and S2 use a common optical deflector 5 together. Furthermore, the first and second optical scanning devices S1 and S2 are disposed symmetrically with respect to a plane (X-Z plane) which contains the rotation axis of the optical deflector 5 and which is parallel to the sub-scan direction, and they use light beams having been scanningly deflected by different deflecting surfaces.

In the first and second optical scanning devices S1 and S2 described above, the light source devices 1a and 1c (1b and 1d) each comprises a semiconductor laser. The aperture stops 2a and 2c (2b and 2d) function to shape the beam profile of the light beam passing therethrough. The collimator lenses 3a and 3c (3b and 3d) function to convert the light beams emitted from the light source devices 1a and 1c (1b and 1d) into parallel light beams (or, alternatively, divergent light beams or convergent light beams). The cylindrical lens 4 has a predetermined power (refracting power) only in the sub-scan direction (within the sub-scan section).

It should be noted that the light source devices 1a and 1c (1b and 1d), aperture stops 2a and 2c (2b and 2d), collimator lenses 3a and 3c (3b and 3d) and cylindrical lens 4 are components of the input optical system LA (LB).

The optical deflector 5 comprises a rotary polygonal mirror (polygon mirror) having four deflecting surfaces, and it is rotated at a constant speed in the direction of an arrow A in the drawing, by driving means such as a motor (not shown). In the present embodiment, the first and second optical scanning devices S1 and S2 share this optical deflector 5 as described above. More specifically, the first and second optical scanning devices S1 and S2 use the light beams having been scanningly deflected by different deflecting surface 5a and 5b of the optical deflector 5.

Denoted at 15a (15b) is an imaging optical system (fθ lens system) having a light collecting function and a fθ characteristic. It comprises first and second imaging lenses (optical elements) 6a and 7a (6b and 7b) having a positive refracting power (power) in the main-scan section and sub-scan section. The imaging optical system 15a (15b) is configured to image two light beam scanningly deflected by the optical deflector 5 into a spot shape upon corresponding scanned surfaces 8a and 8c (8b and 8d). Furthermore, the imaging optical system 15a (15b) is configured to provide a conjugate relationship between the deflecting surface 5a (5b) of the optical deflector 5 and the scanned surface 8a or 8c (8b or 8d) within the sub-scan section, by which surface tilt compensation is performed.

The first imaging lens 6a (6b) in the present embodiment is disposed on a light path between the optical deflector 5 and a light blocking plate (upper or lower light blocking plate) to be described below. It has a refracting power (power) only in the main-scan direction, and has no refracting power (non-power) in the sub-scan direction.

Here, "no refracting power" includes a case where the refracting power is substantially zero, and it may be 1/50 or less of the refracting power of the imaging optical system 15a (15b) in the main-scan direction.

Denoted at 10aU (10bU) is a light blocking plate as a light-blocking member. It is disposed above, with respect to the sub-scan direction, the effective light beam which passes through the imaging optical system: namely, within the sub-scan section it is disposed at the anti-photosensitive-drum-side of the normal to the deflecting surface 5a which contains the deflection point. Furthermore, the light blocking plate 10aU (10bU) is disposed perpendicularly to the main-scan section, at a position of a distance $L_U$[mm] spaced apart from an axial deflection point O and, also, in parallel to the main-scan direction, so as to block the ghost light produced in the imaging optical system 15a (15b). Hereinafter, this light blocking plate 10aU (10bU) will be referred to also as an upper light blocking plate.

Denoted at 10aL (10bL) is a light blocking plate as a light-blocking member. It is disposed below, with respect to the sub-scan direction, the effective light beam which passes through the imaging optical system: namely, within the sub-scan section it is disposed at the photosensitive-drum-side of the normal to the deflecting surface 5a which contains the deflection point. Furthermore, the light blocking plate 10aL (10bL) is disposed perpendicularly to the main-scan section, at a position of a distance $L_L$ [mm] spaced apart from the axial deflection point O and, also, in parallel to the main-scan direction, so as to block the ghost light produced in the imaging optical system 15a (15b). Hereinafter, this light blocking plate 10aL (10bL) will be referred to also as a lower light blocking plate.

The upper and lower light blocking plates 10aU and 10aL (10bU and 10bL) have a shape configured not to shade the effective light beam scanningly deflected by the optical deflector 5, within the whole area of the effective scan region on each scanned surface 8a and 8c (8b and 8d).

In the present embodiment, the end portions of the upper and lower light blocking plates 10aU and 10aL (10bU and 10bL) are formed with a curved shape whose height in the sub-scan direction changes with the position in the main-scan direction. Here, with regard to main-scan direction, the point of intersection with the optical axis of the imaging optical system 15a (15b) is taken as the center. As for the curved shape, it is so curved that the spacing between (i) the plane (XY plane) which is perpendicular to the rotational axis of the optical deflector 5 and which contains the axial deflection point O and (ii) the end portion of the light blocking plate (upper and lower light blocking plates 10aU and 10aL (10bU and 10bL) in the sub-scan direction enlarges, from the central position toward the off-axis position (peripheral position).

Furthermore, the upper and lower light blocking plates 10aU and 10aL (10bU and 10bL) have a planar shape (linear shape) in the main-scan direction.

Denoted at 20a, 21a and 22a (20b, 21b and 22b) are reflecting mirrors as light ray separating means, which function to reflect the light beam passed through the imaging optical system 15a (15b) back to the corresponding photosensitive drum surfaces 8a and 8c (8b and 8d).

In the present embodiment, first of all, in the first optical scanning device S1, two light beams having been optically modulated by the light source devices 1a and 1c in accordance with the imagewise information and emitted therefrom go through the aperture stops 2a and 2c (whereby they are partly shaded). The two light beams passing through the aperture stops 2a and 2c are then converted into parallel light beams by means of the collimator lenses 3a and 3c and are incident on the cylindrical lens 4. Within the main-scan section, the light beams incident on the cylindrical lens 4 go out of the same while being unchanged. Within the sub-scan section, on the other hand, the light beams are converged and incident on the deflecting surface 5a of the optical deflector 5 at different angles (oblique incidence) to form a linear image (linear image elongating in the main-scan direction).

The two light beams scanningly deflected by the deflecting surface 5a of the optical deflector 5 are imaged by the imaging optical system 15a, in a spot shape on the photosensitive drum surfaces 8a and 8c through corresponding reflecting mirrors 20a, 21a and 22a. Then, by rotating the optical deflector 5 in the direction of an arrow A, the photosensitive drum surfaces 8a and 8c are optically scanned in the direction of an arrow B (main-scan direction) at a constant speed. With this procedure, image recording is performed on the photosensitive drum surfaces 8a and 8c which are a recording medium.

In the second optical scanning device S2, on the other hand, two light beams emitted from the light source devices 1b and 1d are incident on the deflecting surface 5b of the optical deflector 5 in the same direction as the incidence direction of the first optical scanning device S1, at different angles (oblique incidence). The two light beam scanningly deflected by the deflecting surface 5b are imaged by the imaging optical system 15b, in a spot shape on the photosensitive drum surfaces 8b and 8d through corresponding reflecting mirrors 20b, 21b and 22b, to optically scan the same.

In this manner, in the present embodiment, a single scanning line is defined on each of the four photosensitive drum surfaces 8a, 8b, 8c and 8d, and image recording is performed.

Figure 3:
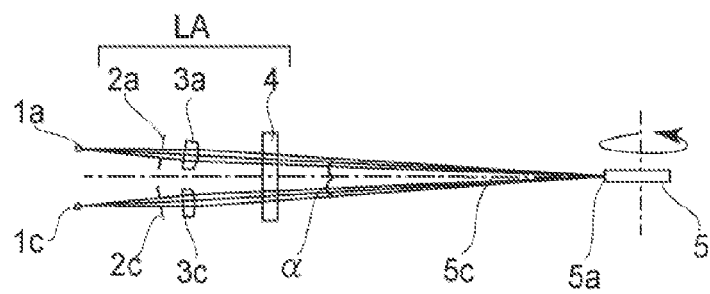
FIG. 3 is a sub-scan sectional view of an input optical system of the first embodiment of the present invention.

FIG. 3 is a sub-scan sectional view of the input optical system LA of the first optical scanning device S1 shown in FIG. 1. In FIG. 3, like numerals are assigned to components corresponding to those of FIG. 1. Here, the structure and optical function of the input optical system LB of the second optical scanning device S2 are same as those of the input optical system LA of the first optical scanning device S1.

As shown in FIG. 3, there are two input optical systems LA (LB) which are placed above and below as seen in the drawing, such that, in the sub-scan section, the light beams from the input optical system LA (LB) are incident on the deflecting surface 5a (5b) from obliquely above and from obliquely below with respect to the normal 5c, respectively. The two light beams obliquely incident on the deflecting surface 5a (5b) are conically scanned upwardly and downwardly, respectively, as seen in the drawing by means of the optical deflector 5. Then, the light beam (upper oblique incidence light beam) being reflected upwardly and the light beam (lower oblique incidence light beam) being reflected downwardly pass through an upper portion and a lower portion of the same first imaging lens 6a (6b). Then, they are reflected by corresponding reflecting mirrors 20a, 21a and 22a (20b, 21b and 22b). The two reflected light beams are scanned over two different photosensitive drum surfaces 8a and 8c (8b and 8d) as an imaging spot.

In the present embodiment as described above, the first and second input optical systems LA and LB of the first and second optical scanning device S1 and S2 are comprised of an oblique incidence optical systems, and the first and second optical scanning device S1 and S2 are disposed opposed to each other. This enables sharing optical components, making the overall device structure compact.

However, in an image forming apparatus using first and second optical scanning devices S1 and S2 disposed opposed to each other, there is a possibility that the ghost light produced in the first and second optical scanning devices S1 and S2 is incident on the scanned surface 8a, 8c, 8b or 8d, to cause image deteriorate.

Figure 4A:
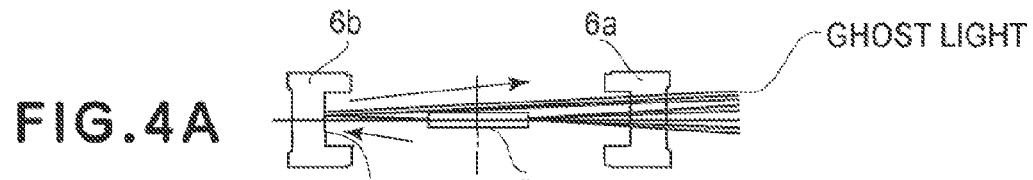
FIGS. 4A, 4B and 4C are diagrams for explaining ghost light in the first embodiment of the present invention.
Figure 4B:
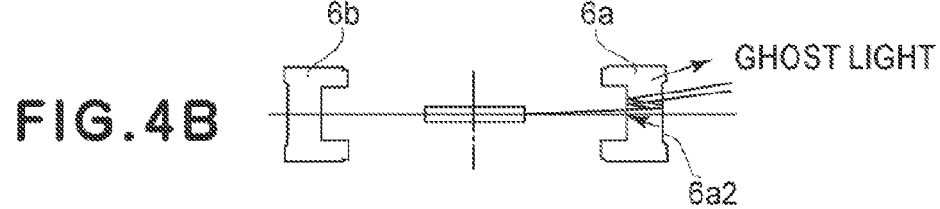
Figure 4C:
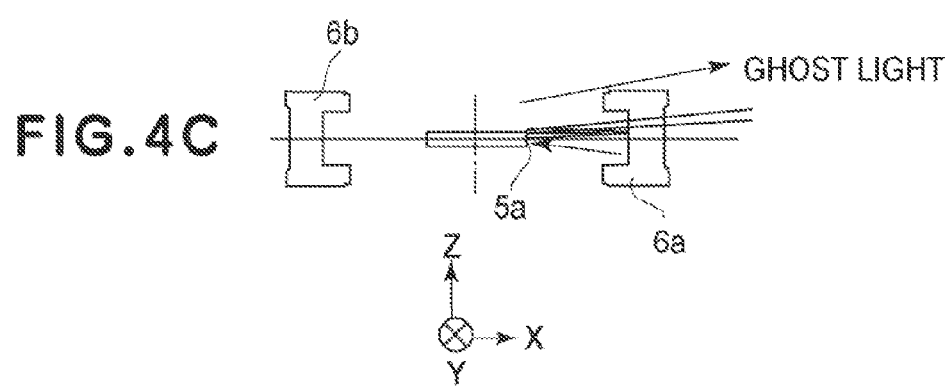

FIGS. 4A, 4B and 4C are schematic diagrams which illustrate an example of ghost light produced in each optical scanning device. In these drawings, like numerals are assigned to components corresponding to those of FIG. 2B.

FIGS. 4A, 4B and 4C are sub-scan sectional views which depict main portions of the first and second optical scanning devices S1 and S2 which are disposed opposed to each other, and illustrate the principle of ghost light called "opposite-face reflection ghost".

More specifically, in FIG. 4A, when a light beam scanningly deflected by the optical deflector 5 passes through the first imaging lens 6b, a portion of the light beam does not pass through the first imaging lens 6b but is reflected by a first side (light entrance surface) 6b1 thereof. In FIG. 4B, when a light beam scanningly deflected by the optical deflector 5 passes through the first imaging lens 6a, a portion of the light beam is reflected by a second surface (light exit surface) 6a2. In FIG. 4C, a portion of the light beam incident on the deflecting surface 5a of optical deflector 5 is reflected by the deflecting surface 5a.

The light beam thus reflected by these surfaces is called opposite-face reflection ghost light, and the ghost light from the second optical scanning device S2 enters into the light path of the right-hand side first optical scanning device S1 disposed opposed to the optical deflector 5. If such opposite-face reflection ghost light reaches the scanned surface 8a or 8c, stripes or color irregularity will be produced in the formed image.

In consideration of this, in the present embodiment, there are upper and lower light blocking plates 10aU and 10aL (10bU and 10bL) disposed inside the imaging optical system 15a (15b) to block such opposite-face reflection ghost. The upper light blocking plate 10aU (10bU) functions to block the opposite-face reflection ghost light coming through the upper portion of the optical deflector 5 as viewed in the drawing, while the lower light blocking plate 10aL (10bL) functions to block the opposite-face reflection ghost light coming through the lower portion of the optical deflector 5 as viewed in the drawing.

Here, the shape of the upper and lower light blocking plates 10aU and 10aL (10bU and 10bL) will be explained with reference to FIGS. 5A and 5B.

Figure 5A:
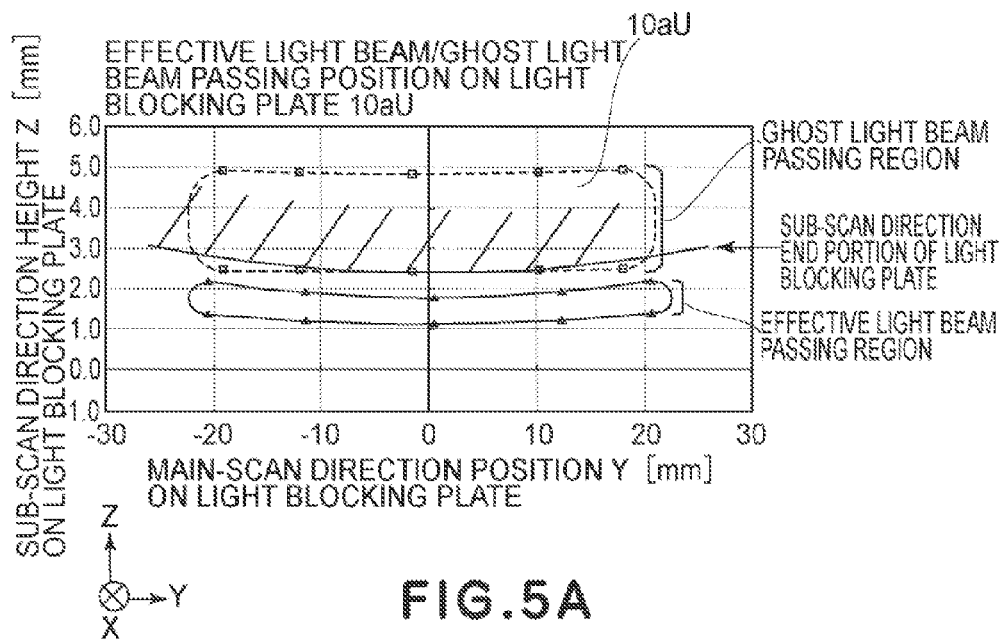
FIG. 5A is a schematic diagram which illustrates a passage region of ghost light in an effective light beam passage region on an upper light blocking plate of the first embodiment of the present invention.
Figure 5B:
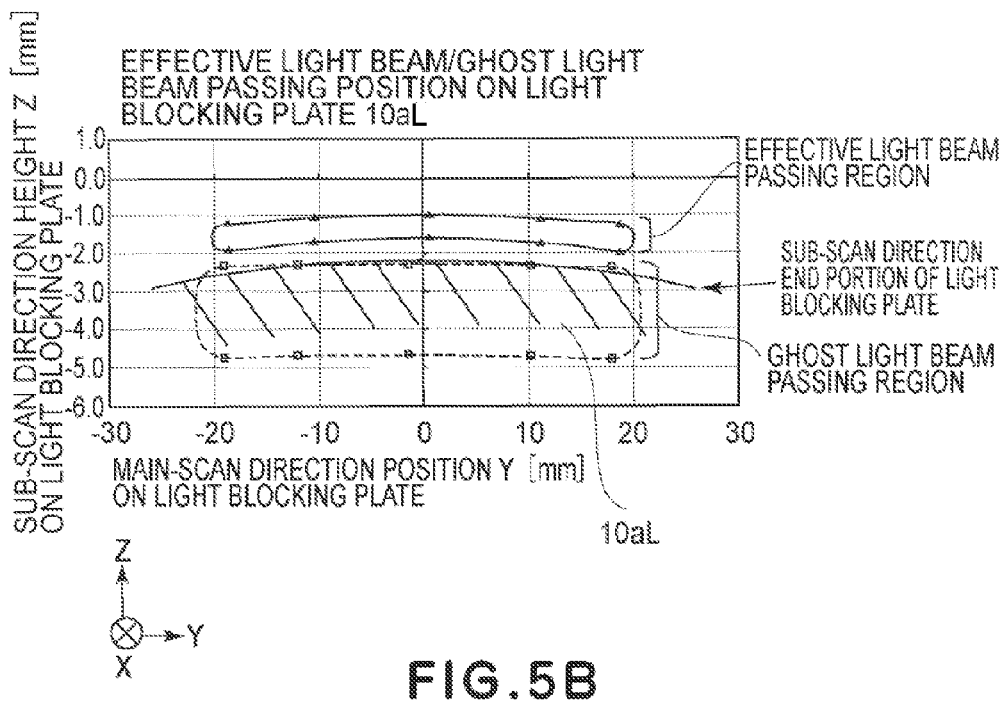
FIG. 5B is a schematic diagram which illustrates a passage region of ghost light in an effective light beam passage region on a lower light blocking plate of the first embodiment of the present invention.

FIG. 5A and FIG. 5B are graphs (schematic diagrams) which depict the passage region (scan locus) of the effective light beam (solid line) to be used for the image formation on the light blocking plate as seen from the optical axis direction of the imaging optical system and the passage region of the ghost light (dotted line) as well as the shape of the end-portion of the light blocking plate of this embodiment in the sub-scan direction.

FIG. 5A is a schematic diagram where the upper light blocking plate 10aU (10bU) is disposed above the effective light beam with respect to the sub-scan direction. FIG. 5B is a schematic diagram where the lower light blocking plate 10aL (10bL) is disposed below the effective light beam with respect to the sub-scan direction.

In FIGS. 5A and 5B, the axis of abscissas in the graph represents the position Y (mm) in the main-scan direction and upon the light blocking plate, and it coincides with the main-scan direction. The position Y=0 corresponds to the point of intersection between the optical axis of the imaging optical system 15a (15b) and the light blocking plate. In the present embodiment, since the axial deflection point O is on the extension line of the optical axis of the imaging optical system 15a (15b), it coincides with the position of Y=0 in the graph. Furthermore, the axis of ordinate of the graph represents the height Z (mm) in the sub-scan direction, and it depicts the height in the sub-scan direction from a plane (X-Y plane) which is perpendicular to the rotational axis of the optical deflector 5 and which contains the axial deflection point O.

As seen from FIGS. 5A and 5B, the passage region of the ghost light and the passage region (scan locus) of the effective light beam are very close to each other. Furthermore, since the present embodiment concerns an oblique incidence optical system, the effective light beam is conically scanned such that the scan locus of the effective light beam in the main-scan direction is curved to rise as it displaces from the optical axis of imaging optical system 15a (15b) to an abaxial portion.

Figure 11A:
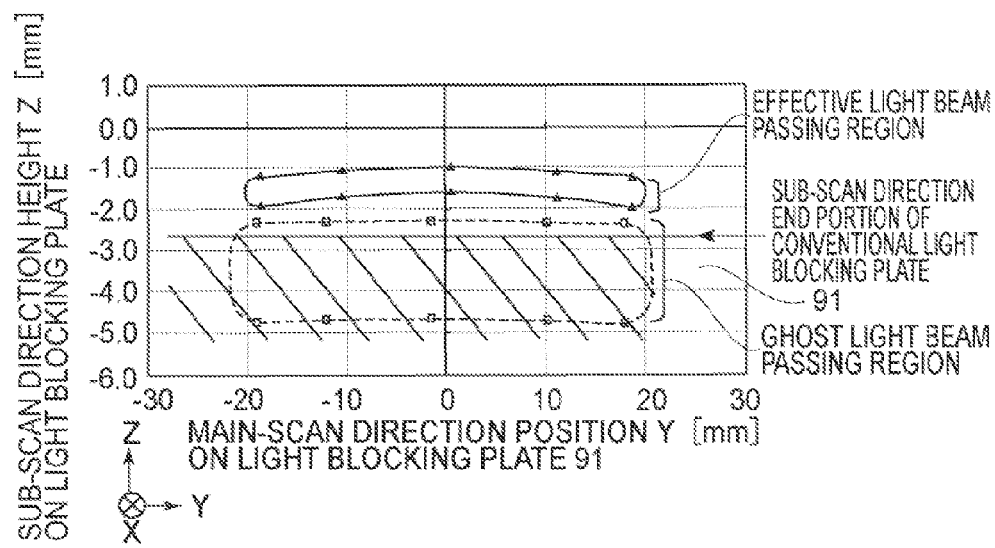
FIG. 11A is a schematic diagram which illustrates the passage region of ghost light in the effective light beam passage region on a conventional upper light blocking plate.
Figure 11B:
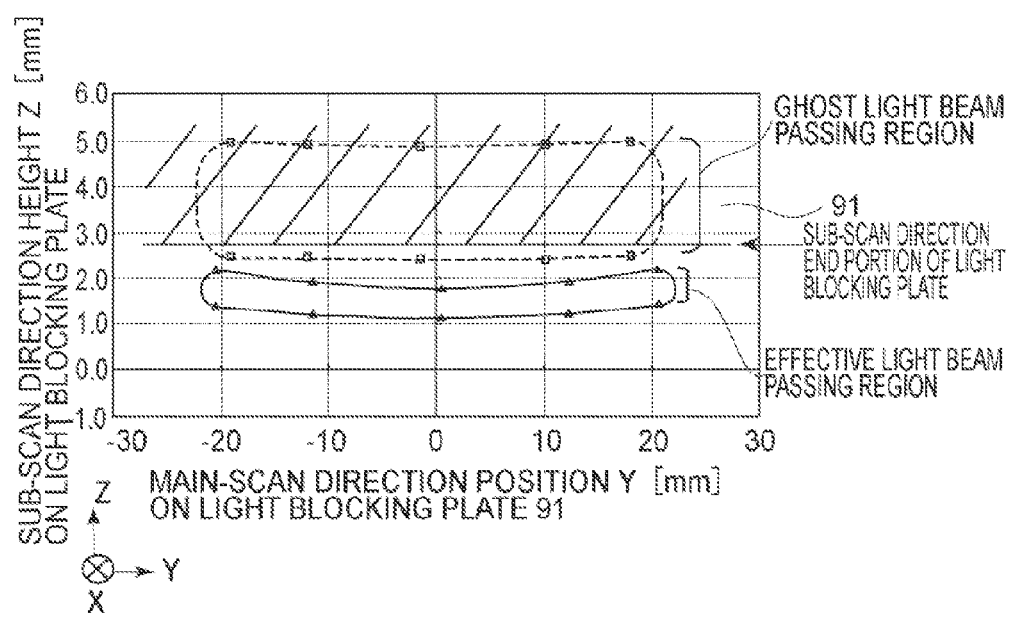
FIG. 11B is a schematic diagram which illustrates the passage region of ghost light in the effective light beam passage region on a conventional lower light blocking plate.

If the scan trace of the effective light beam is curved as described above, with the conventional light blocking plate 91 having an end portion in the sub-scan direction with linear shape, the ghost light can not be blocked sufficiently. Referring to FIGS. 11A and 11B, the reason thereof will be explained. Here, FIGS. 11A and 11B show an example wherein, for comparison with the present embodiment, a conventional light blocking plate 91 is used in the present embodiment.

Since the conventional light blocking plate 91 has an end portion with a linear shape which is flat in the sub-scan direction, as shown in FIGS. 11A and 11B, the end portion of light blocking plate 91 has a straight-line shape extending in the main-scan direction.

Here, in order to avoid that the effective light beam is eclipsed by the light blocking plate 91, the height of the end portion of the light blocking plate 91 must be set in accordance with the highest position of the passage of the effective light beam, that is, the passage region of the effective light beam in the peripheral (off-axis) portion in the main-scan direction. As a result of this, at the central position with respect to the main-scan direction, the end portion of the light blocking plate 91 has to be placed at an unnecessarily upward position as viewed in the drawing, and hence the ghost light can not be blocked sufficiently.

In the present embodiment, the shape of the end portion of the upper and lower light blocking plate 10aU and 10aL (10bU and 10bL) is curved to follow the scan locus of the effective light beam.

More specifically, in the present embodiment, as seen from FIGS. 5A and 5B, the shape of the end portion of the upper and lower light blocking plates 10aU and 10aL (10bU and 10bL) is so curved that the height Z in the sub-scan direction rises, from the central portion in the main-scan direction toward the off-axis (peripheral) portion.

Figure 6A:
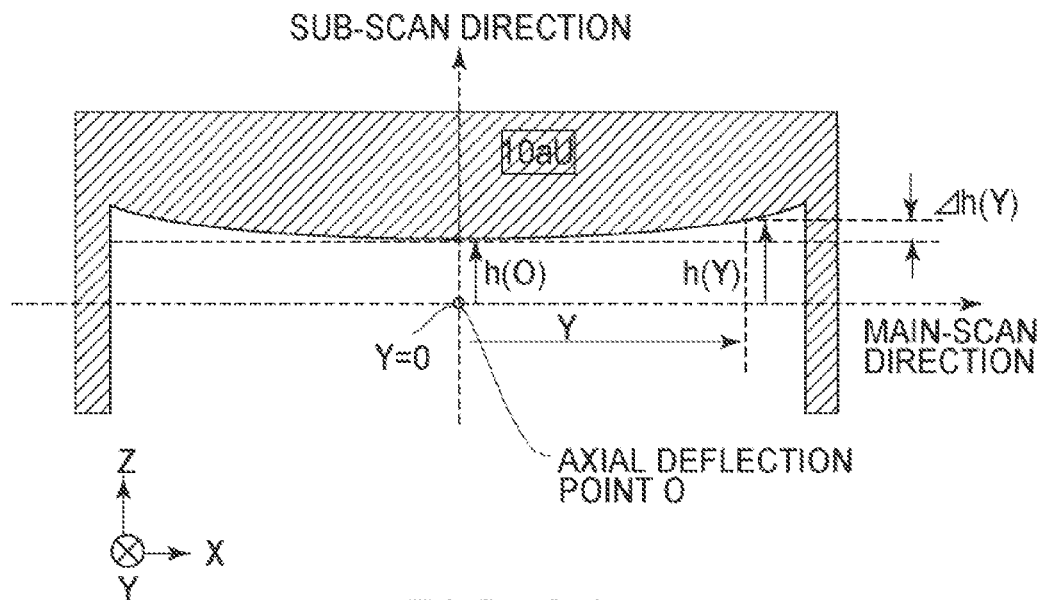
FIG. 6A is a schematic diagram which illustrates the shape of the upper light blocking plate of the first embodiment of the present invention.
Figure 6B:
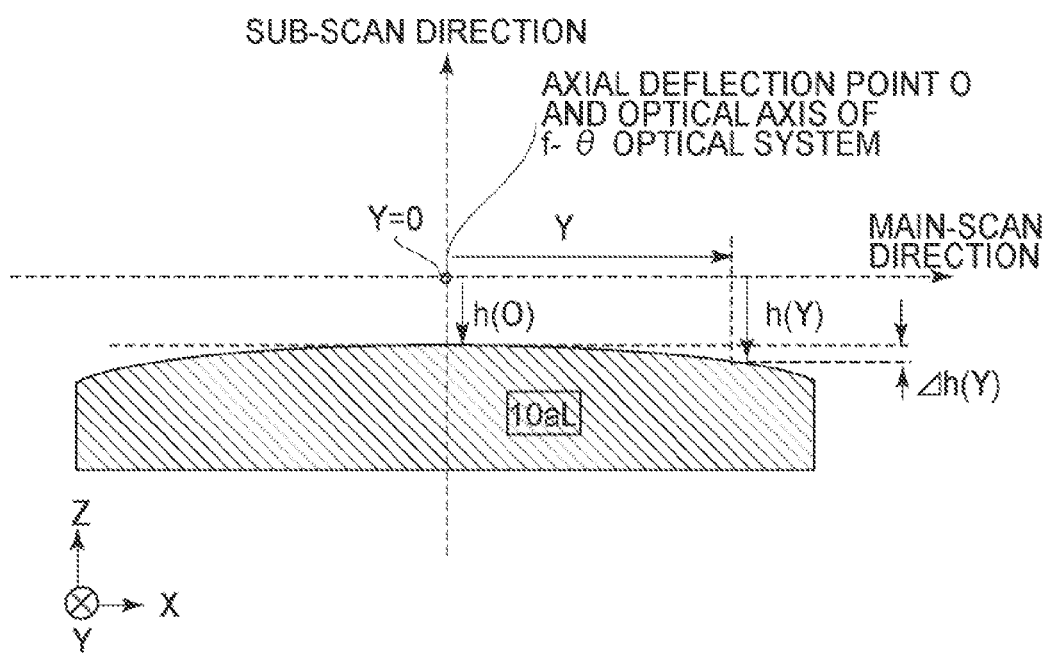
FIG. 6B is a schematic diagram which illustrates the shape of the lower light blocking plate of the first embodiment of the present invention.

FIG. 6A is a schematic diagram which illustrates the shape of the upper light blocking plate 10aU (10bU) and FIG. 6B is a schematic diagram illustrating the shape of the lower light blocking plate 10aL (10bL).

In the present embodiment, an arbitrary position in the main-scan direction on the light blocking plate (upper and lower light blocking plates 10aU and 10aL (10bU and 10bL)) is denoted by Y [mm] (the point of intersection between the optical axis of the imaging optical system and the light blocking plate being taken as Y=0). Furthermore, the spacing at an arbitrary position Y in the main scan direction, between (i) the plane (X-Y plane) perpendicular to the rotation axis of the optical deflector 5 and containing the axial deflection point O and (ii) the end portion of the light blocking plate (upper and lower light blocking plates 10aU and 10aL (10bU and 10bL)) in the sub-scan direction, is denoted by h(Y) [mm]. Furthermore, the spacing at the position Y=0 in the main-scan direction is denoted by h(0) [mm].

Furthermore, the difference of spacing h(Y) to the spacing h(0) is defined as a curved quantity Δh(Y) of the light blocking plate (upper and lower light blocking plates 10aU and 10aL (10bU and 10bL)). Also, the oblique incidence angle of the optical axis in the sub-scan direction is denoted by α [rad] (the angle defined between the plane which is perpendicular to the rotation axis of the optical deflector 5 and the light ray which is incident on the deflecting surface). Furthermore, within the plane (X-Z plane), the distance from the axial deflection point O to the light blocking plate (upper and lower light blocking plates 10aU and 10aL (10bU and 10bL)) is denoted by L [mm] (in FIG. 2B it is equivalent to $L_U$ or $L_L$). In that occasion, the curved quantity Δh(Y) of the light blocking plate (upper and lower light blocking plates 10aU and 10aL (10bU and 10bL)) is set to satisfy the following conditions throughout the whole area of the effective scan region.

$$0.5 \leq \Delta h(Y) \div \left[\tan\alpha \times L \times \left\{\frac{1}{\cos\{\text{ATAN}(\frac{|Y|}{L})\}} - 1\right\}\right] \leq 1.5 \quad (1)$$

$$\Delta h(Y) = |h(Y) - h(0)| \quad (2)$$

With regard to the conditional expression (1) above, if the curved quantity Δh(Y) of the light blocking plate (upper and lower light blocking plates 10aU and 10aL (10bU and 10bL)) is set to satisfy the conditional expression (1) throughout the whole area of the effective scan region, the ghost light can be blocked sufficiently without shading the effective light beam.

The reason why the ghost light can be blocked sufficiently without shading the effective light beam if the conditional expression (1) is satisfied, will be explained below.

Now, the oblique incidence angle of the optical axis in the sub-scan direction is denoted by α [rad] as described above, and an arbitrary scan angle θ [rad] is taken as the angle which is defined within the main-scan section between the scanning light beam and the optical axis of the imaging optical system 15a (15b). Also, the axial deflection point (deflection point when θ=0) is denoted by O. Furthermore, the deviation amount from the axial deflection point O of the deflection point when the arbitrary scan angle is equal to θ is denoted by ΔX [mm].

In this image forming apparatus, the light blocking plate (upper and lower light blocking plates 10aU and 10aL (10bU and 10bL)) is disposed at a position spaced by L ($L_U$ or $L_L$) [mm] from the axial deflection point O, perpendicularly to the main-scan section and in parallel to the main-scan direction. Here, it is assumed that no optical element is disposed between the axial deflection point O and the light blocking plate (upper and lower light blocking plates 10aU and 10aL (10bU and 10bL)).

With an arbitrary scan angle θ, the distance L' in the main-scan section until the light beam scanningly deflected at the deflection point reaches the light blocking plate (upper and lower light blocking plates 10aU and 10aL (10bU and 10bL)) can be expressed by a function of θ as follows.

$$L'(\theta) = L/\cos(\theta) + \Delta X \qquad (3)$$

Here, where a rotary polygonal mirror (polygon mirror) is used as the deflecting means, ΔX≠0. However, since the deviation amount ΔX is sufficiently small as compared with L/cos(θ), Equation (3) can be replaced by the following approximation formula.

$$L'(\theta) \approx L/\cos(\theta) \qquad (4)$$

Furthermore, with a scan angle θ, the height H (taking the axial deflection point O as zero) in the sub-scan direction as the light beam arrives the light blocking plate (upper and lower light blocking plates 10aU and 10aL (10bU and 10bL)) can be expressed by:

$$H(\theta) = L'(\theta) \times \tan(\alpha) \qquad (5)$$

When Equation (4) is substituted into Equation (5), it follows that:

$$H(\theta) \approx L/\cos(\theta) \times \tan(\alpha) \qquad (6)$$

Here, the position in the main-scan direction where the light beam reaches the light blocking plate (upper and lower light blocking plates 10aU and 10aL (10bU and 10bL)) if the scan angle is θ is denoted by Y [mm], and the position in the main-scan direction where the light beam reaches the light blocking plate when the scan angle θ=0 is denoted by Y=0 [mm]. Then, it follows that:

$$Y = L \times \tan(\theta) \qquad (7)$$

Converting this, it follows that:

$$\theta = \mathrm{ATAN}(Y/L) \qquad (8)$$

Now, Equation (8) is substituted into Equation (6), and it follows that:

$$H(Y) = \left\{\frac{1}{\cos\{\mathrm{ATAN}(\frac{Y}{L})\}}\right\} \times L \times \tan\alpha \qquad (9)$$

Figure 7:
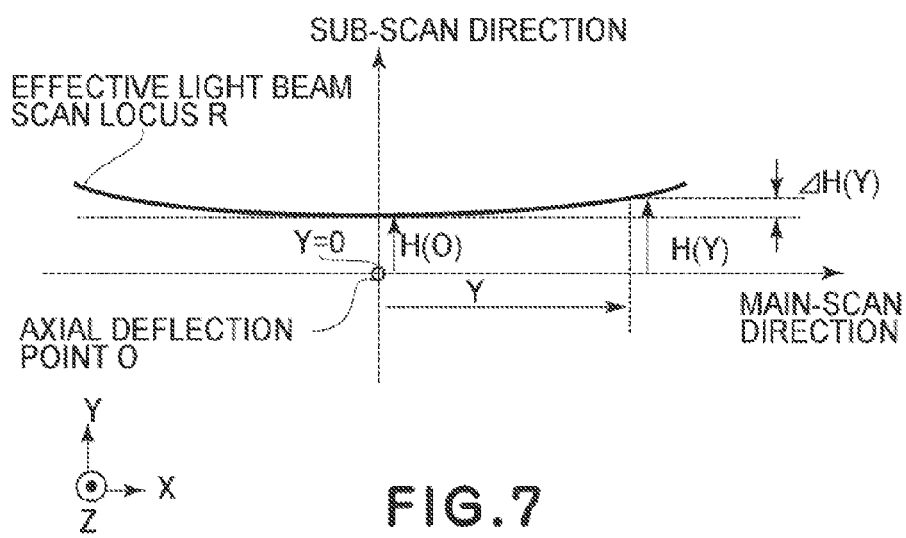
FIG. 7 is a schematic diagram which illustrates the scan locus of the effective light beam on the light blocking plate of the first embodiment of the present invention.

FIG. 7 illustrates the scan locus R on the upper light blocking plate of light beam as represented by Equation (9). FIG. 7 depicts the scan locus R on the upper light blocking plate of the effective light beam when the light beam conically scanned reaches the upper light blocking plate.

It be seen from FIG. 7 that the scan locus R on the upper light blocking plate 10aU (10bU) of the conically scanned light beam, as it goes to the off-axis (peripheral) portion from the optical axis of the imaging optical system with respect to the main-scan direction, is curved in the direction spaced away from the plane (X-Y plane) which is perpendicular to the rotation axis of the optical deflector and which contains the axial deflection point.

Here, as shown in FIG. 7, an arbitrary curved quantity ΔH(Y) of the scan locus R of the light beam in the main scan direction on the light blocking plate is defined as the height H(Y) in the sub-scan direction with an arbitrary scan angle θ, relative to the height H(0) in the sub-scan direction where the light beam reaches the light blocking plate when Y=0. Then, the curved quantity ΔH(Y) can be expressed as follows.

$$\Delta H(Y) = H(Y) - H(0) \qquad (10)$$

$$\Delta H(Y) = \left\{\left\{\frac{1}{\cos\{\mathrm{ATAN}(\frac{Y}{L})\}}\right\} \times L \times \tan\alpha\right\} - \left\{\left\{\frac{1}{\cos\{\mathrm{ATAN}(\frac{0}{L})\}}\right\} \times L \times \tan\alpha\right\} \qquad (11)$$

$$\Delta H(Y) = \left\{\frac{1}{\cos\{\mathrm{ATAN}(\frac{Y}{L})\}} - 1\right\} \times L \times \tan\alpha \qquad (12)$$

As described above, if there is no optical element between the axial deflection point O and the light blocking plate (upper and lower light blocking plates 10aU and 10aL (10bU and 10bL)), the scan locus R of the effective light beam on the light blocking plate can be detected based on the approximation formula of Equation (12). Furthermore, even if there is an optical element such as a lens or a mirror disposed between the axial deflection point and the light blocking plate (upper and lower light blocking plates 10aU and 10aL (10bU and 10bL)), the influence upon the curved quantity ΔH(Y) is sufficiently small as long as the power in the sub-scan direction of such optical element is small. Hence, the approximation formula (12) applies.

In the present embodiment, there is a first imaging lens 6a (6b) disposed on the light path between the light blocking plate (upper and lower light blocking plates 10aU and 10aL (10bU and 10bL)) and the optical deflector 5. However, the first imaging lens 6a (6b) has a power only in the main-scan direction as described hereinbefore and it has no power in the sub-scan direction. As a result, there occurs substantially no change in the angle in the sub-scan direction before and after the light beam passes through the first imaging lens 6a (6b).

Hence, even in the present embodiment, the curved quantity of the effective light beam on the light blocking plate (upper and lower light blocking plates 10aU and 10aL (10bU and 10bL)) can be approximated by Equation (12).

In the present embodiment, in order to sufficiently block the ghost light without shading the effective light beam, the shape of the end portion of the light blocking plate (upper and lower light blocking plates 10aU and 10aL (10bU and 10bL)) in the sub-scan direction is set to follow the scan locus of the effective light beam.

More specifically, the curved quantity Δh(Y) of the shape of the end portion of the light blocking plate (upper and lower light blocking plates 10aU and 10aL (10bU and 10bL)) is set to satisfy the following conditional expression (13). By doing so, the curved quantity of the light blocking plate (upper and lower light blocking plates 10aU and 10aL (10bU and 10bL)) is kept within the range of ±50% of the curved quantity of the effective light beam as detected by the approximation formula (12).

Namely, in this embodiment, the ratio between the curved quantity Δh(Y) and the curved quantity ΔH(Y) is set to satisfy the following conditional expression (13).

$$0.5 \leq \Delta h(Y)/\Delta H(Y) \leq 1.5 \quad (13)$$

Here, substituting Equation (12) into Equation (13), the following conditional expression (1) is given.

$$0.5 \leq \Delta h(Y) \div \left[\tan\alpha \times L \times \left\{\frac{1}{\cos\{ATAN(\frac{|Y|}{L})\}} - 1\right\}\right] \leq 1.5 \quad (1)$$

$$\Delta h(Y) = |h(Y) - h(0)| \quad (2)$$

More preferably, the curved quantity Δh(Y) of the shape of the end portion of the light blocking plate (upper and lower light blocking plates 10aU and 10aL (10bU and 10bL)) had better be kept within in the range of ±20% of the curved quantity of the effective light beam detectable with the approximation formula (12). Namely, the shape of the light blocking plate (upper and lower light blocking plates 10aU and 10aL (10bU and 10bL)) should be set to satisfy the following conditional expression (14).

$$0.8 \leq \Delta h(Y) \div \left[\tan\alpha \times L \times \left\{\frac{1}{\cos\{ATAN(\frac{|Y|}{L})\}} - 1\right\}\right] \leq 1.2 \quad (14)$$

In the upper light blocking plate 10aU (10bU) of the present embodiment, α=3 deg. and the distance $L_U$ from the axial deflection point O to the upper light blocking plate 10aU (10bU) is $L_U$=31 mm. Furthermore, in the effective scan region, the effective light beam passes through the region of Y=−21 mm to +21 mm in the main-scan direction on the upper light blocking plate 10aU (10bU). Thus, throughout the whole area of the effective scan region, the conditional expression (1) is satisfied. Here, when Y=19 mm, ΔH(Y)=0.34 [mm]

Δh(Y)=0.44 [mm]

Δh(Y)/ΔH(Y)=1.3

This satisfies the conditional expression (1).

Furthermore, in the lower light blocking plate 10aL (10bL) of the present embodiment, α=3 deg. and the distance $L_L$ from the axial deflection point O to the lower light blocking plate 10aL (10bL) is $L_L$=26 mm. Furthermore, in the effective scan region, the effective light beam passes through the region of Y=−19 mm to +19 mm in the main-scan direction on the lower light blocking plate 10aL (10bL). Thus, throughout the whole area of the effective scan region, the conditional expression (1) is satisfied. Here, when Y=19 mm, ΔH(Y)=0.33 [mm]

Δh(Y)=0.39 [mm]

Δh(Y)/ΔH(Y)=1.2

This satisfies the conditional expression (1).

In the present embodiment, in order that the shape of the end portion of the light blocking plate (upper and lower light blocking plates 10aU and 10aL (10bU and 10bL)) is made simple and the molding difficulty for the light blocking plate is lowered, the shape of the end portion of the light blocking plate in the sub-scan direction is made arcuate (arcuate shape).

The upper light blocking plate 10aU (10bU) is constituted by arcuate shape having a radius of 500 mm, and it is set so that the height in the sub-scan direction enlarges, as the position leaves from the optical axis with respect to the scan direction.

The lower light blocking plate 10aL (10bL) is constituted by an arcuate shape of a radius of 460 mm, and it is set so that the height in the sub-scan direction is lowered, leaving from the optical axis with respect to the scan direction.

In the present embodiment, throughout the whole area of the effective scan region, a spatial isolation spacing of not less than 0.3 mm is maintained between the effective light beam and the end portion of the light blocking plate (upper and lower light blocking plates 10aU and 10aL (10bU and 10bL)) in the sub-scan direction. Furthermore, the structure is so set that, even if the passage position of the effective light beam deviates due to the mounting tolerance of optical components or the like, the light blocking plate (upper and lower light blocking plates 10aU and 10aL (10bU and 10bL)) does not shade the effective light beam.

As can be seen from FIGS. 4A, 4B and 4C, in the oblique incidence optical system, there is a tendency that the spacing between the effective light beam which is scanningly deflected rightwardly as viewed in the drawing relative to the optical deflector 5 and the opposite-face reflection ghost becomes largest at a position closest to the optical deflector 5. Furthermore, the spacing tends to become small, leaving from the optical deflector 5. In consideration of this, in order that only the ghost light is assuredly blocked without shading the effective light beam, the light blocking plate (upper and lower light blocking plates 10aU and 10aL (10bU and 10bL)) should desirably be placed closely as much as possible to the optical deflector 5.

On the other hand, if the light blocking plate (upper and lower light blocking plates 10aU and 10aL (10bU and 10bL)) is too close to the optical deflector 5, there occurs a problem of large noise.

In consideration of this, in the present embodiment, the light blocking plate (upper and lower light blocking plates 10aU and 10aL (10bU and 10bL)) is disposed at a position between the first imaging lens 6a (6b) and the second imaging lens 7a (7b) and close as much as possible to the first imaging lens 6a (6b). With this arrangement, the two contradicting conditions described above are balanced.

However, the advantageous results provided by the present invention are still attainable even if the upper light blocking plate 10aU (10bU) or lower light blocking plate 10aL (10bL) or both of them are disposed on the light path between the optical deflector 5 and the first imaging lens 6a (6b), as long as the conditional expression (1) is satisfied.

Furthermore, in the present embodiment, for smallness in size of the system, an optics box for holding the optical scanning device and the light blocking plate (upper and lower light blocking plates 10aU and 10aL (10bU and 10bL)) are formed by integral molding (die molding).

Here, for easily dies cutting, the position of the light blocking plate (upper and lower light blocking plates 10aU and 10aL (10bU and 10bL)) is shifted by 3 mm relative to the imaging optical system 15a (15b) in the optical axis direction.

It should be noted that, although in this embodiment the optics box and the light blocking plate (upper and lower light blocking plates 10aU and 10aL (10bU and 10bL)) are formed by integral molding, the invention is not limited to this. They may be constituted by separate members.

Furthermore, although in this embodiment the upper light blocking plate 10aU (10bU) and the lower light blocking plate 10aL (10bL) are formed by separate members, the invention is not limited to this. They may be formed by integral molding.

Furthermore, although in the present embodiment the lower light blocking plate 10aL (10bL) is disposed at the optical deflector 5 side of the upper light blocking plate 10aU (10bU), the invention is not limited to this. The upper light blocking plate 10aU (10bU) may be disposed at the optical deflector 5 side of the lower light blocking plate 10aL (10bL).

Furthermore, although in this embodiment the imaging optical system 15a (15b) is comprised of two pieces of lenses, it may be constituted by lenses of three or more pieces. Moreover, although in this embodiment the first imaging lens 6a (6b) is comprised of a single piece of lens, it may be constituted by lenses of two or more pieces.

In the present embodiment, the first imaging lens 6a (6b) is comprised of a toric lens which has no refracting power in the sub-scan direction (the curvature radius R of the first surface in the sub-scan direction is R=−1000 mm and the curvature radius R of the second surface in the sub-scan direction is R=−1000 mm) and the shape of which in the main-scan direction is arcuate. With this structure, the fθ performance of the first imaging lens 6a (6b) is satisfied without making the scan locus of the effective light beam after the passage the first imaging lens 6a (6b) complicated.

Furthermore, in the present embodiment, the first and second optical scanning devices S1 and S2 are disposed opposed to each other for further reduction in size of the system, the invention is not limited to this. The light blocking plate of the present embodiment may be used in an image forming apparatus in which such opposed disposition is not adopted. Even in such image forming apparatus, various ghost lights such as internal reflection ghost of a lens or re-reflection ghost of an optical deflector, can be blocked satisfactorily, and the advantageous results of the present invention are still available.

Furthermore, in the present embodiment, for simplification of the shape of the light blocking plate (upper and lower light blocking plates 10aU and 10aL (10bU and 10bL)), the shape in the main-scan section is made linear. However, the invention is not limited to this. As long as the conditional expression (1) is satisfied, the advantageous results of the present invention are obtainable even if the shape of the light blocking plate (upper and lower light blocking plates 10aU and 10aL (10bU and 10bL)) in the main-scan section is made to follow a curved line.

Furthermore, in the present embodiment, for simplification of the shape of the light blocking plate (upper and lower light blocking plates 10aU and 10aL (10bU and 10bL)) and for lowering the molding difficultly, a straight-line shape is used. However, the invention is not limited to this. Even if a curved shape is used in the main scan section, the advantageous results of the present invention are still obtainable as long as the shape of the end portion in the sub-scan direction is curved to follow the scan locus of the effective light beam.

Furthermore, in this embodiment, the axial deflection point O is made coincident with the optical axis of the imaging optical system 15a (15b). However, the invention is not limited to this. For correction of lateral asymmetry of the optical characteristics, the optical axis of the imaging optical system 15a (15b) may be disposed with a deviation of few millimeters in the main-scan direction relative to the axial deflection point O. For example, a deviation of 1 mm to 5 mm may be given.

Even in that occasion, the amount of shift of the optical axis of the imaging optical system 15a (15b) in the main-scan direction would be sufficiently small as compared with the width, in the main-scan direction, of the light beam passing over the light blocking plate (upper and lower light blocking plates 10aU and 10aL (10bU and 10bL)). Therefore, if the light blocking plate (upper and lower light blocking plates 10aU and 10aL (10bU and 10bL)) is set to satisfy the conditional expression (1), the shape of the end portion of the light blocking plate can follow the scan locus of the effective light beam without causing any particular problem. Hence, advantageous results of the present invention are attainable.

Table 1 shows a specific structure of the optical scanning device according to the first embodiment of the present invention. Furthermore, Table 2 shows a specific structure of the input optical system of the first embodiment, that is, R (curvature radius), D (lens spacing and lens thickness) and N refractive index of materials. Also, Table 3 shows the aspherical surface shape of the cylindrical lens in the first embodiment.

It should be noted here that the numerical examples of Table 1, Table 2 and Table 3 show the first optical scanning device S1, and this applies to the numerical examples of the second optical scanning device S2.

TABLE 1

| STRUCTURE OF THE FIRST EMBODIMENT | | | |
|---|---|---|---|
| Angle defined between optical axes of input optical system and imaging optical axis in main-scan direction | $2\phi$ | 90 | deg |
| Largest effective scan angle | plus/minus $\theta$max | 38.2 | deg |
| Collimator lens focal distance | Fcol | 20 | mm |
| Polygon inscribed radius | R | 7.07 | mm |
| Sub-scan oblique incidence angle (upper imaging optical system) | $\alpha$ | 3 | deg |
| Sub-scan oblique incidence angle (lower imaging optical system) | $\alpha$ | −3 | deg |
| Imaging optical system sub-scan magnification | Bs | 1.3 | times |
| Sub-scan direction resolution | Dpi | 600 | dpi |
| Effective scan width | W | 224 | mm |
| f-theta coefficient of imaging optical system | K | 167.8 | mm/rad |

TABLE 1-continued

STRUCTURE OF THE FIRST EMBODIMENT

| | | | |
|---|---|---|---|
| Distance from axial deflection point to 2nd surface of light blocking plate 10aU | LU | 31 | mm |
| Distance from axial deflection point to 2nd surface of light blocking plate 10aL | LL | 26 | mm |
| Curvature radius of sub-scan end portion shape of light blocking plate 10aU | RU | 500 | mm |
| Curvature radius of sub-scan end portion shape of light blocking plate 10aL | RL | 460 | mm |
| Height of sub-scan direction end portion at position Y = 0 in main-scan direction of light blocking plate 10aU | h(0) | 2.4 | mm |
| Height of sub-scan direction end portion at position Y = 0 in main-scan direction of light blocking plate 10aL | h(0) | −2.2 | mm |
| Thickness of light blocking plate 10aU | dU | 2 | mm |
| Thickness of light blocking plate 10aL | dL | 2 | mm |

TABLE 2

| RDN OF FIRST EMBODIMENT | SURFACE | R | D | N |
|---|---|---|---|---|
| Light emission point 1 of semiconductor laser | 1st | — | 16 | 1 |
| Stop | | — | 2.32 | 1 |
| Collimator lens 3 | 2nd | infinite | 3 | 1.762 |
| | 3rd | −15.22 | 12.43 | 1 |
| Cylindrical lens 4 | 4th | Table 3 | 3 | 1.524 |
| | 5th | infinite | 77.26 | 1 |
| Deflection surface 5a of polygonal mirror | 6th | infinite | | 1 |

TABLE 3

CYLINDRICAL LENS OF 1ST EMBODIMENT

| | | Cylindrical lens 4 4th surface |
|---|---|---|
| Meridional shape | R | infinite |
| Sagittal shape | r | 58.62 |

Embodiment 2

Figure 8:
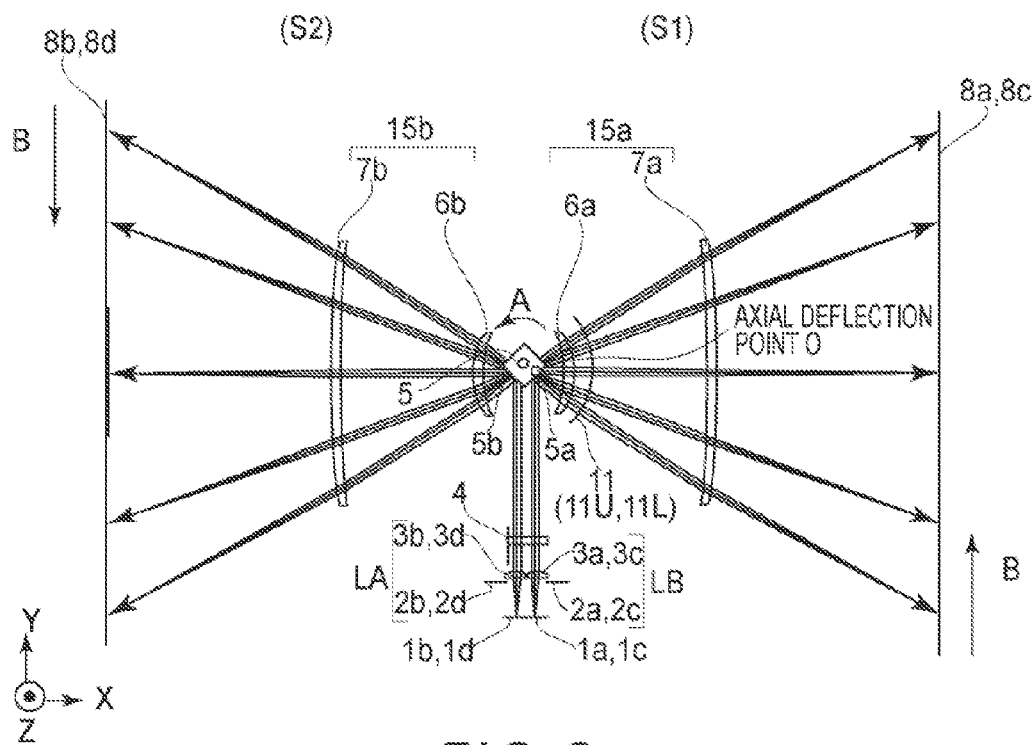
FIG. 8 is a main-scan sectional view of a second embodiment of the present invention.
Figure 9:
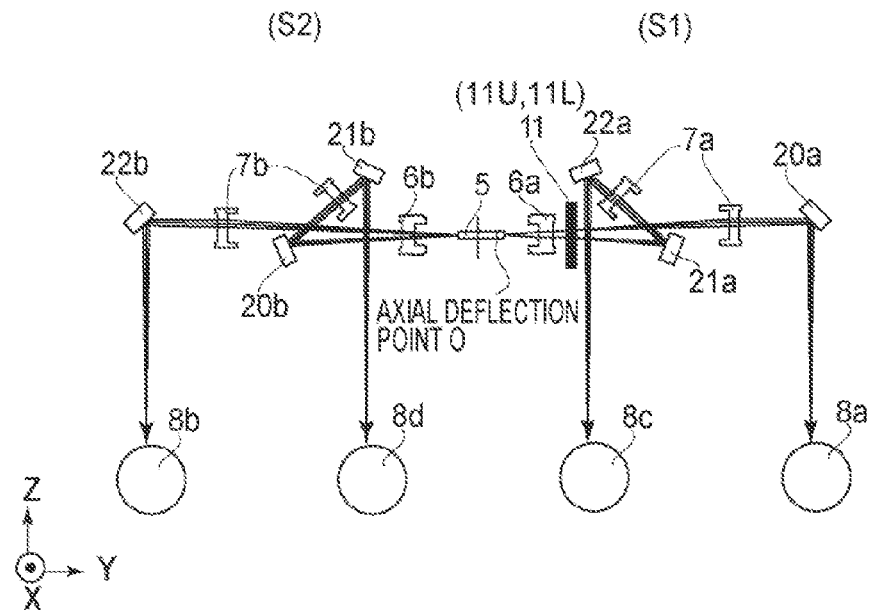
FIG. 9 is a sub-scan sectional view of the second embodiment of the present invention.

FIG. 8 is a sectional view (main-scan sectional view) of a main portion of a second embodiment of the present invention, along the main-scan direction. FIG. 9 is a sectional view (sub-scan sectional view) of the main portion of the second embodiment of the present invention, along the sub-scan direction. In FIG. 8 and FIG. 9, like numerals are assigned to components corresponding to those of FIG. 1 and FIG. 2A.

The present embodiment differs from the preceding first embodiment in that the disposition and shape of the light blocking plate 11 are different. Other structures and optical functions are similar to the first embodiment and, based on this, similar advantageous effects are obtainable.

Denoted in the drawings at 11 is a light blocking plate as the light blocking member, comprising an upper light blocking plate 11U and a lower light blocking plate 11L which are formed by integral molding. The light blocking plate functions to block ghost light to produced in the imaging optical system 15a (15b).

The light blocking plate 11 of the present embodiment is provided inside the imaging optical system 15a, and it has an aperture. It is so shaped that, within the whole area of the effective scan region on the scanned surface 8a and 8b, it does not shade the effective light beam scanningly deflected from the optical deflector 5.

In the first embodiment described hereinbefore, the upper and lower light blocking plates are formed with a straight shape (i.e., planar plate) in the main-scan section. As compared therewith, in the present embodiment, the shape of the light blocking plate 11 is formed with a curved shape in main-scan section. With this arrangement, the shape of the end portion of the light blocking plate 11 can follow the effective light beam being conically scanned.

More specifically, in this embodiment, the shape of the light blocking plate in the main-scan section is curved to approach the optical deflector 5, as the position leaves from the optical axis of the imaging optical system 15a. This assures that, at any position within the main-scan section, the distance between the light blocking plate 11 and the axial deflection point O is coincident.

Specifically, the shape of the light blocking plate 11 in the main-scan section is made arcuate (arcuate shape) around the center taken at the axial deflection point O and having a radius R=31 mm.

Furthermore, in the present embodiment, the shape of the end portion of the light blocking plate 11 in the sub-scan direction is made straight (linear shape).

Figure 10:
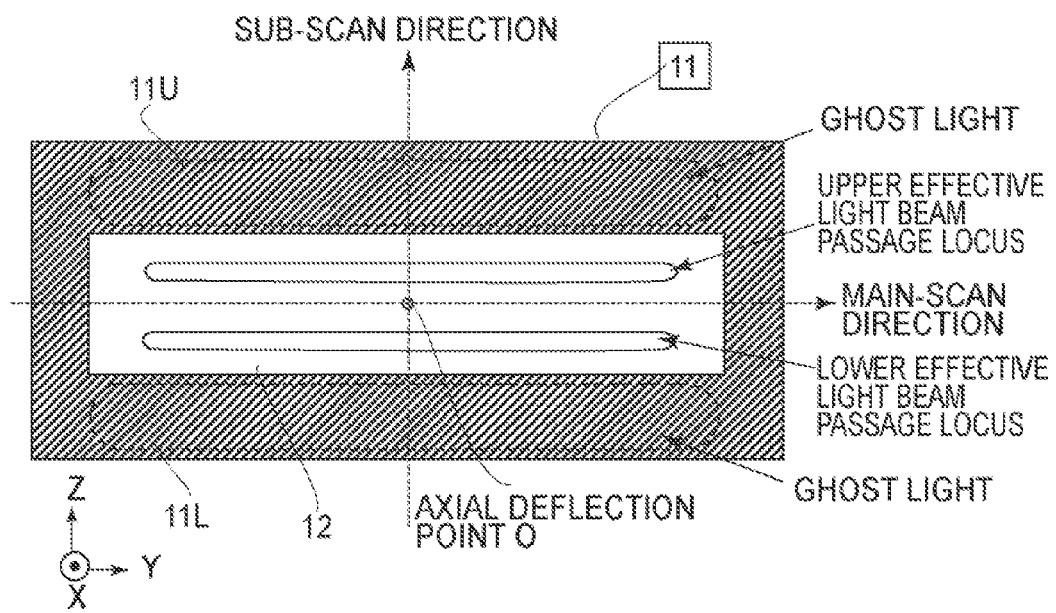
FIG. 10 is a schematic diagram which illustrates the effective light beam passage region on the light blocking plate as well as the ghost light passage region in the second embodiment of the present invention.

FIG. 10 is a graph (schematic diagram) which illustrates upper and lower passage regions (scan locus) of an effective light beam (solid line) to be used for the image formation in this embodiment, as seen from the optical axis direction of the imaging optical system, and the passage region of ghost light (dotted line) as well as the opening shape of the light blocking plate of the present embodiment.

Denoted in FIG. 10 at 11 is a light blocking plate which comprises an upper light blocking plate 11U and a lower light blocking plate 11L formed by integral molding. Denoted at 12 is an aperture which is so shaped to pass the upper and lower effective light beams therethrough.

As can be seen from FIG. 10, in this embodiment, by making the shape of the light blocking plate 11 in the main-scan section curved as described above, the passage region of the effective light beam can be made straight. As a result of this, throughout the whole scan region, the shape of the end portion of the light blocking plate 11 can follow the passage region of the effective light beam, while keeping the straight shape. Hence, the ghost light can be blocked sufficiently without shading the effective light beam.

Furthermore, in the present embodiment, throughout the whole area of the effective scan region, the end portion of the light blocking plate 11 in the sub-scan direction is set at a height 0.6 mm spaced apart from the effective light beam. With this arrangement, even if the effective light beam shifts in the sub-scan direction due to mounting tolerance or the like, it is assured that the effective light beam is not shaded by the light blocking plate 11.

Although in this embodiment the upper and lower light blocking plates of the light blocking plate 11 are made by integral molding to assure smallness in size of the system, the invention is not limited to this. The upper and lower light blocking plates may be constituted by separate members.

Furthermore, although in the present embodiment, for lowered molding difficultly of the light blocking plate 11, the shape of the end portion of the light blocking plate 11 in sub-scan section is set to a straight shape, the invention is not limited to this. Even if a curved shape is used, the advantageous results of the present invention are still obtainable.

Although in this embodiment the light blocking plate 11 is provided in the first optical scanning device S1, it may be provided in the second optical scanning device S2 or, alternatively, it may be provided in both of these optical scanning devices S1 and S2.

While some embodiments of the present invention have been described with reference to examples of color image forming apparatus having a plurality of optical scanning devices, the invention is not limited to this. The present invention is applicable also to an image forming apparatus wherein a monochromatic image is produced by use of a single optical scanning device.

Embodiment of Image Forming Apparatus

Figure 12:
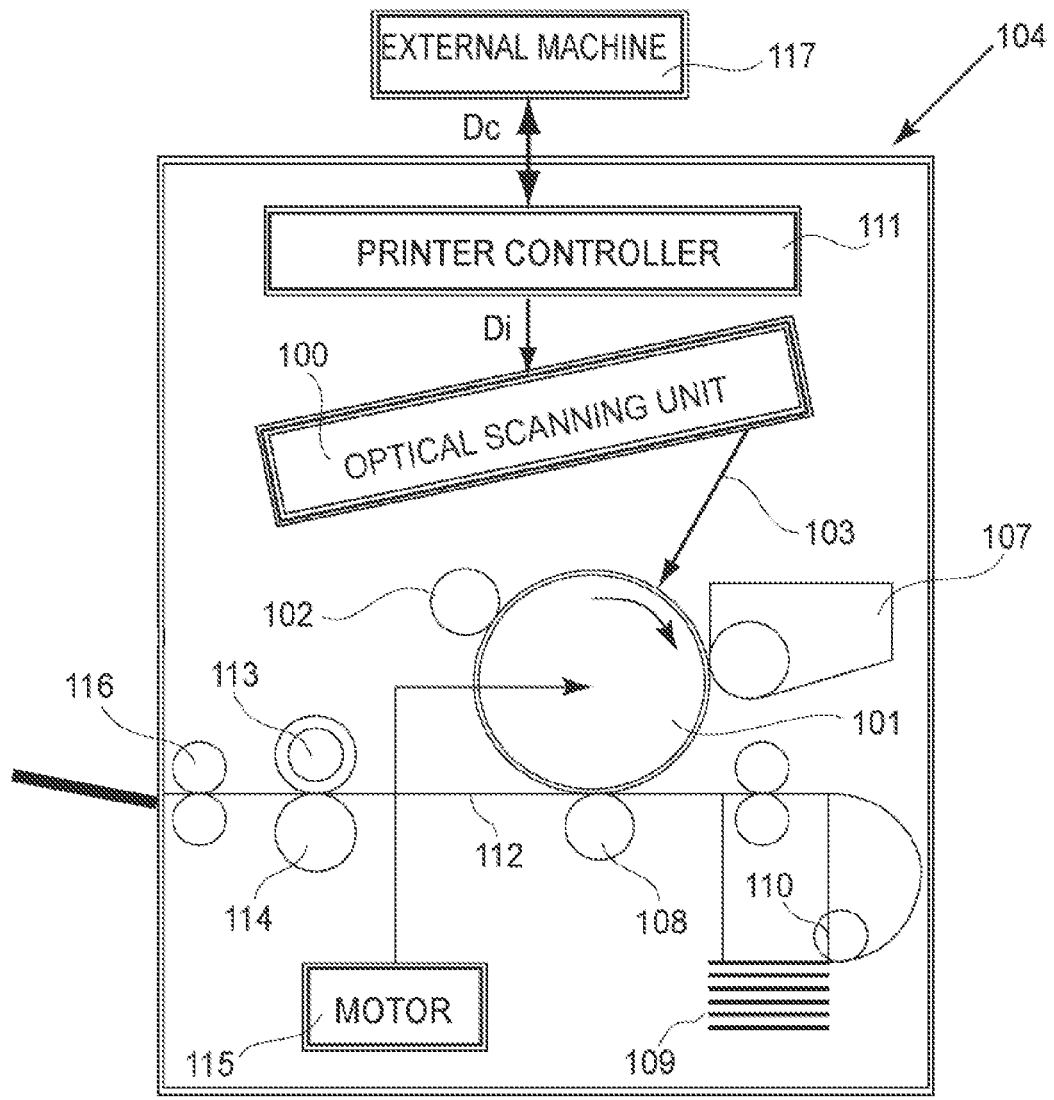
FIG. 12 is a schematic diagram of a main portion of an image forming apparatus according to an embodiment of the present invention.

FIG. 12 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) D1.

The imagewise data D1 is then inputted into an optical scanning unit 100 which is configured in accordance with any one of the preceding embodiments described hereinbefore. The optical scanning unit 100 produces a light beam 103 having been modulated in accordance with the imagewise data D1, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data D1. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 12) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 12) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 12, the printer controller 111 has various functions in addition to the data conversion function described hereinbefore, such as for controlling a motor 115 or any other components inside the image forming apparatus as well as a polygon motor inside the optical scanning unit (to be described later).

Embodiment of Color Image Forming Apparatus

Figure 13:
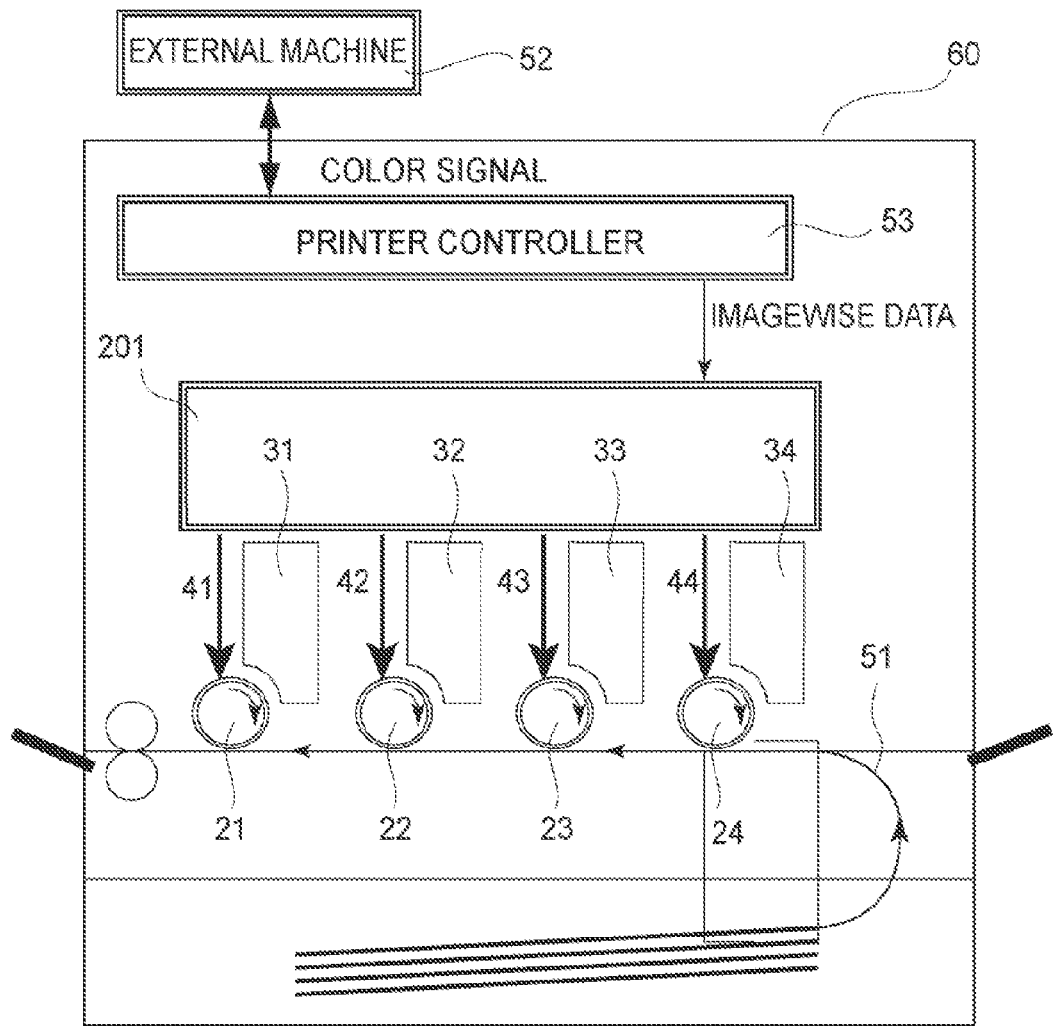
FIG. 13 is a schematic diagram of a main portion of a color image forming apparatus according to an embodiment of the present invention.

FIG. 13 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 13, denoted generally at 60 is a color image forming apparatus. Denoted at 201 is an image forming apparatus having a structure as has been described with reference to the first or second embodiment. Denoted at 21, 22, 23 and 24 are photosensitive drums (image bearing members), and denoted at 31, 32, 33 and 34 are developing devices, respectively. Denoted at 51 is a conveyance belt, and denoted at 52 is an external machine such as a personal computer, for example. Denoted at 53 is a printer controller for converting color signals supplied from the external machine 52 into imagewise data of different colors and applying them to the image forming apparatus 201.

In FIG. 13, the color image forming apparatus 60 receives color signals of R (red), G (green) and B (blue) supplied thereto from the outside machine 52 such as a personal computer, for example. These color signals are transformed by means of the printer controller 53 inside the image forming apparatus, into imagewise data (dot data) corresponding to C (cyan), M (magenta), Y (yellow) and B (black).

These imagewise data are inputted into the optical scanning devices 11, 12, 13 and 14, respectively. In response, these optical scanning devices produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, the single image forming apparatus 201 produces light beams corresponding to the colors of C (cyan), M (magenta), Y (yellow) and B (black), respectively. Then, imagewise signals (imagewise information) are recorded on the photosensitive drum surfaces 21, 22, 23 and 24, whereby a color image is printed at high speed.

As described, in the color image forming apparatus of this embodiment, based on a single image forming apparatus 201, light beams based on different imagewise data are used to form latent images of different colors on the corresponding photosensitive drums 21, 22, 23 and 24, respectively. After that, these images are superposedly transferred onto a recording sheet on the conveyance belt 51, whereby a single full-color image is produced thereon. Then, the full-color image is transferred to the sheet material (paper).

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-120513 filed May 1, 2007, for which is hereby incorporated by reference.

What is claimed is:

1. An optical scanning device, comprising:
a light source device;
a deflecting device having a deflecting surface;
an input optical system configured to direct a light beam from said light source device to the deflecting surface of said deflecting device; and
an imaging optical system configured to direct a light beam scanningly deflected by the deflecting surface of said deflecting device, upon a surface to be scanned;
wherein, in a sub scan section, the light beam to be incident on the deflecting surface of said deflecting device is incident thereon from an oblique direction with respect to an optical axis of said imaging optical system,
wherein a light blocking member configured to block ghost light is disposed on a light path between the deflecting surface and the scanned surface,
wherein said light blocking member includes an upper light blocking part and a lower light blocking part which are arranged at the different positions with respect to the sub scan direction and a direction of an optical axis of said imaging optical system,
wherein end portions, adjacent to an effective light beam reflected by the deflecting surface of said deflecting device, of said upper light blocking part and said lower light blocking part are spaced from a passage region in which the effective light beam passes,
wherein each of said end portions is arcuate so that a distance from a plane which is perpendicular to a rotational axis of said deflecting device and which contains an axial deflection point of the light beam incident on the deflecting surface of said deflecting device enlarges as it comes outwardly from a central portion of itself in a main scan direction,
wherein the upper blocking part and lower blocking part are integrally molded with an optics box supporting said light source device, said deflecting device, said input optical system, and said imaging optical system, and
wherein an arcuate portion of one of the end portions which is closer to the deflecting surface of said deflecting device in the direction of the optical axis of said imaging optical system has a radius smaller than that of an arcuate portion of the other end portion.

2. An image forming apparatus comprising:
an optical scanning device, including,
a light source device,
a deflecting device having a deflecting surface,
an input optical system configured to direct a light beam from said light source device to the deflecting surface of said deflecting device, and
an imaging optical system configured to direct a light beam scanningly deflected by the deflecting surface of said deflecting device, upon a surface to be scanned,
wherein, in a sub scan section, the light beam to be incident on the deflecting surface of said deflecting device is incident thereon from an oblique direction with respect to an optical axis of said imaging optical system,
wherein a light blocking member configured to block ghost light is disposed on a light path between the deflecting surface and the scanned surface,
wherein said light blocking member includes an upper light blocking part and a lower light blocking part which are arranged at the different positions with respect to the sub scan direction and a direction of an optical axis of said imaging optical system,
wherein end portions, adjacent to an effective light beam reflected by the deflecting surface of said deflecting device, of said upper light blocking part and said lower light blocking part are spaced from a passage region in which the effective light beam passes,
wherein each of said end portions is arcuate so that a distance from a plane which is perpendicular to a rotational axis of said deflecting device and which contains an axial deflection point of the light beam incident on the deflecting surface of said deflecting device enlarges as it comes outwardly from a central portion of itself in a main scan direction,
wherein the upper blocking part and lower blocking part are integrally molded with an optics box supporting said light source device, said deflecting device, said input optical system, and said imaging optical system, and
wherein an arcuate portion of one of the end portions which is closer to the deflecting surface of said deflecting device in the direction of the optical axis of said imaging optical system has a radius smaller than that of an arcuate portion of the other end portion, and;
said image forming apparatus further comprising:
a photosensitive member having a surface which is the surface to be scanned;
a developing device for developing a latent image formed on the surface of said photosensitive member into a toner image;
an image transfer device for transferring the toner image on to a transfer member; and
an image fixing device for fixing the toner image on the transfer member.

* * * * *